United States Patent
O'Connell et al.

(10) Patent No.: US 10,353,780 B1
(45) Date of Patent: Jul. 16, 2019

(54) INCREMENTAL BACKUP IN A DISTRIBUTED BLOCK STORAGE ENVIRONMENT

(71) Applicant: EMC CORPORATION, Hopkinton, MA (US)

(72) Inventors: Mark A. O'Connell, Westborough, MA (US); Helen S. Raizen, Jamaica Plain, MA (US); Brad Bowlin, Fort Collins, CO (US); Erez Webman, Petach Tikva (IL); Lior Bahat, Kerem Maharal (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 468 days.

(21) Appl. No.: 14/674,308

(22) Filed: Mar. 31, 2015

(51) Int. Cl.
*G06F 17/30* (2006.01)
*G06F 11/14* (2006.01)

(52) U.S. Cl.
CPC ...... *G06F 11/1451* (2013.01); *G06F 2201/84* (2013.01)

(58) Field of Classification Search
CPC .......................... G06F 11/1451; G06F 2201/84
USPC ....................................................... 707/646
See application file for complete search history.

(56) References Cited

U.S. PATENT DOCUMENTS

| | | | | |
|---|---|---|---|---|
| 6,385,706 B1* | 5/2002 | Ofek | ................... | G06F 11/1464 707/999.202 |
| 7,603,533 B1* | 10/2009 | Tsypliaev | .............. | G06F 21/575 709/217 |
| 7,953,948 B1* | 5/2011 | Dyatlov | .............. | G06F 11/1435 709/217 |
| 8,010,495 B1* | 8/2011 | Kuznetzov | .......... | G06F 9/45533 707/649 |
| 8,108,640 B1* | 1/2012 | Holl, II | ............... | G06F 11/1458 711/162 |
| 8,370,301 B1* | 2/2013 | Chen | ................... | G06F 11/1435 707/640 |
| 9,171,002 B1* | 10/2015 | Mam | ......................... | G06F 3/06 |
| 9,424,137 B1* | 8/2016 | Mam | ................... | G06F 11/1451 |

(Continued)

OTHER PUBLICATIONS

U.S. Appl. No. 14/673,998, filed Mar. 31, 2015, O'Connell et al.

(Continued)

*Primary Examiner* — Pierre M Vital
*Assistant Examiner* — Nargis Sultana
(74) *Attorney, Agent, or Firm* — Daly, Crowley Mofford & Durkee, LLP

(57) ABSTRACT

In one aspect, a method includes storing data in a distributed storage environment that includes data servers and configuring each data server to mark a respective bit map for each block of data changed. In another aspect, an apparatus includes electronic hardware circuitry configured to store data in a distributed storage environment that includes data servers and to configure each data server to mark a respective bit map for each block of data changed. In a further aspect, an article includes a non-transitory computer-readable medium that stores computer-executable instructions. The instructions cause a machine to store data in a distributed storage environment that includes data servers and configure each data server to mark a respective bit map for each block of data changed. In each of the aspects above each data server is configured to handle a respective portion of a logical unit.

11 Claims, 6 Drawing Sheets

(56) References Cited

U.S. PATENT DOCUMENTS

| | | | |
|---|---|---|---|
| 2002/0079221 A1 | 6/2002 | Dolphin et al. | |
| 2003/0061399 A1* | 3/2003 | Wagener | G06F 3/0601 719/321 |
| 2005/0015685 A1* | 1/2005 | Yamamoto | G06F 11/0727 714/54 |
| 2005/0086432 A1* | 4/2005 | Sakai | G06F 3/0605 711/114 |
| 2005/0125609 A1* | 6/2005 | Satoyama | G06F 11/2069 711/114 |
| 2006/0015696 A1* | 1/2006 | Nguyen | G06F 11/1456 711/162 |
| 2007/0088767 A1* | 4/2007 | Passerini | G06F 11/1435 |
| 2007/0146788 A1* | 6/2007 | Shinozaki | G06F 11/2082 358/1.16 |
| 2007/0220309 A1* | 9/2007 | Andre | G06F 11/1435 714/6.12 |
| 2008/0301663 A1* | 12/2008 | Bahat | G06F 8/656 717/170 |
| 2009/0006792 A1* | 1/2009 | Federwisch | G06F 16/10 711/162 |
| 2010/0023716 A1* | 1/2010 | Nemoto | G06F 11/1451 711/162 |
| 2010/0076934 A1* | 3/2010 | Pershin | G06F 11/1451 707/640 |
| 2010/0077165 A1* | 3/2010 | Lu | G06F 11/1451 711/162 |
| 2011/0231698 A1* | 9/2011 | Zlati | G06F 11/3006 714/3 |
| 2012/0079221 A1* | 3/2012 | Sivasubramanian | G06F 11/1456 711/162 |
| 2012/0290802 A1* | 11/2012 | Wade | G06F 11/1471 711/162 |
| 2013/0238562 A1* | 9/2013 | Kumarasamy | G06F 11/1451 707/649 |
| 2014/0108351 A1* | 4/2014 | Nallathambi | G06F 11/1451 707/639 |
| 2016/0147607 A1* | 5/2016 | Dornemann | G06F 16/188 711/162 |

OTHER PUBLICATIONS

U.S. Non-Final Office Action dated Feb. 27, 2017 corresponding to U.S. Appl. No. 14/673,998; 28 Pages.

Response filed on Jun. 13, 2017 to Non-Final Office Action dated Feb. 27, 2017; for U.S. Appl. No. 14/673,998; 9 pages.

Final Office Action dated Sep. 29, 2017 from U.S. Appl. No. 14/673,998; 23 Pages.

Request for Continued Examination (RCE) and Response to Final Office Action dated Sep. 29, 2017 corresponding to U.S. Appl. No. 14/673,998; Response Filed Jan. 29, 2018; 14 Pages.

Notice of Allowance dated Mar. 13, 2018 for U.S. Appl. No. 14/673,998; 11 pages.

* cited by examiner

INCREMENTAL BACKUP IN A DISTRIBUTED BLOCK STORAGE ENVIRONMENT

BACKGROUND

Computer data is vital to today's organizations and a significant part of protection against disasters is focused on data protection. As solid-state memory has advanced to the point where cost of storage has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes storing data in a distributed storage environment that includes data servers and configuring each data server to mark a respective bit map for each block of data changed. In another aspect, an apparatus includes electronic hardware circuitry configured to store data in a distributed storage environment that includes data servers and to configure each data server to mark a respective bit map for each block of data changed. In a further aspect, an article includes a non-transitory computer-readable medium that stores computer-executable instructions. The instructions cause a machine to store data in a distributed storage environment that includes data servers and configure each data server to mark a respective bit map for each block of data changed. In each of the aspects above each data server is configured to handle a respective portion of a logical unit.

DETAILED DESCRIPTION

Described herein are techniques to perform incremental backup in a distributed storage environment. Using the techniques described, the tracking of the changes in a logical unit has far less overhead than using snapshots, for example. The change tracking is highly distributed, in line with the distribution of the volume itself, and therefore scales with system size. The incremental backup is naturally parallelized within the distributed block storage system and also scales with system size. The incremental backup can take advantage of read path optimizations which are not available to other clients not using distributed block storage. In one example, this can be done by allowing the data reads (for the incremental backup) to be performed by the data servers, thereby avoiding any network overhead and also allowing bulk reads of disparate portions of the changed data, knowing that all the reads are from a block device local to the data server.

Figure 1:
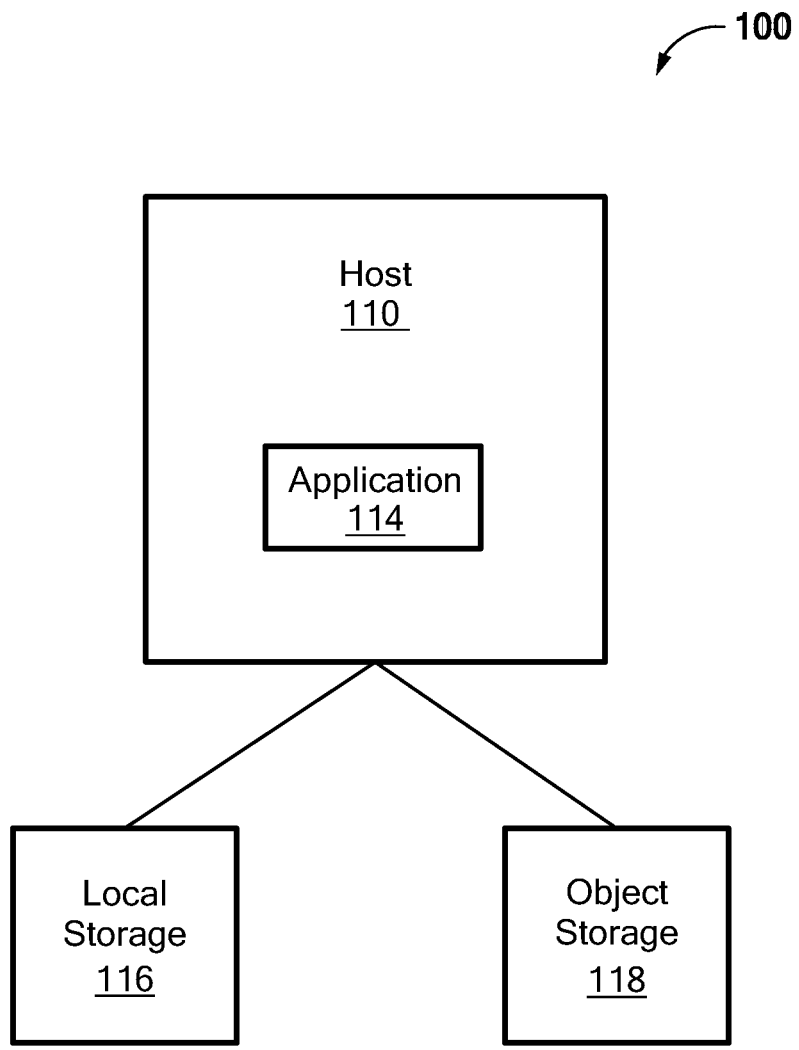
FIG. 1 is a block diagram of an example of a data protection system.

Referring to FIG. 1, a data protection system 100 includes a host running an application 114, a local storage 116 and an object storage 118. The application 114 writes and reads files stored on the local storage. The data protection system 100 maintains a backup of the local storage 116 on the object storage 118.

Figure 2A:
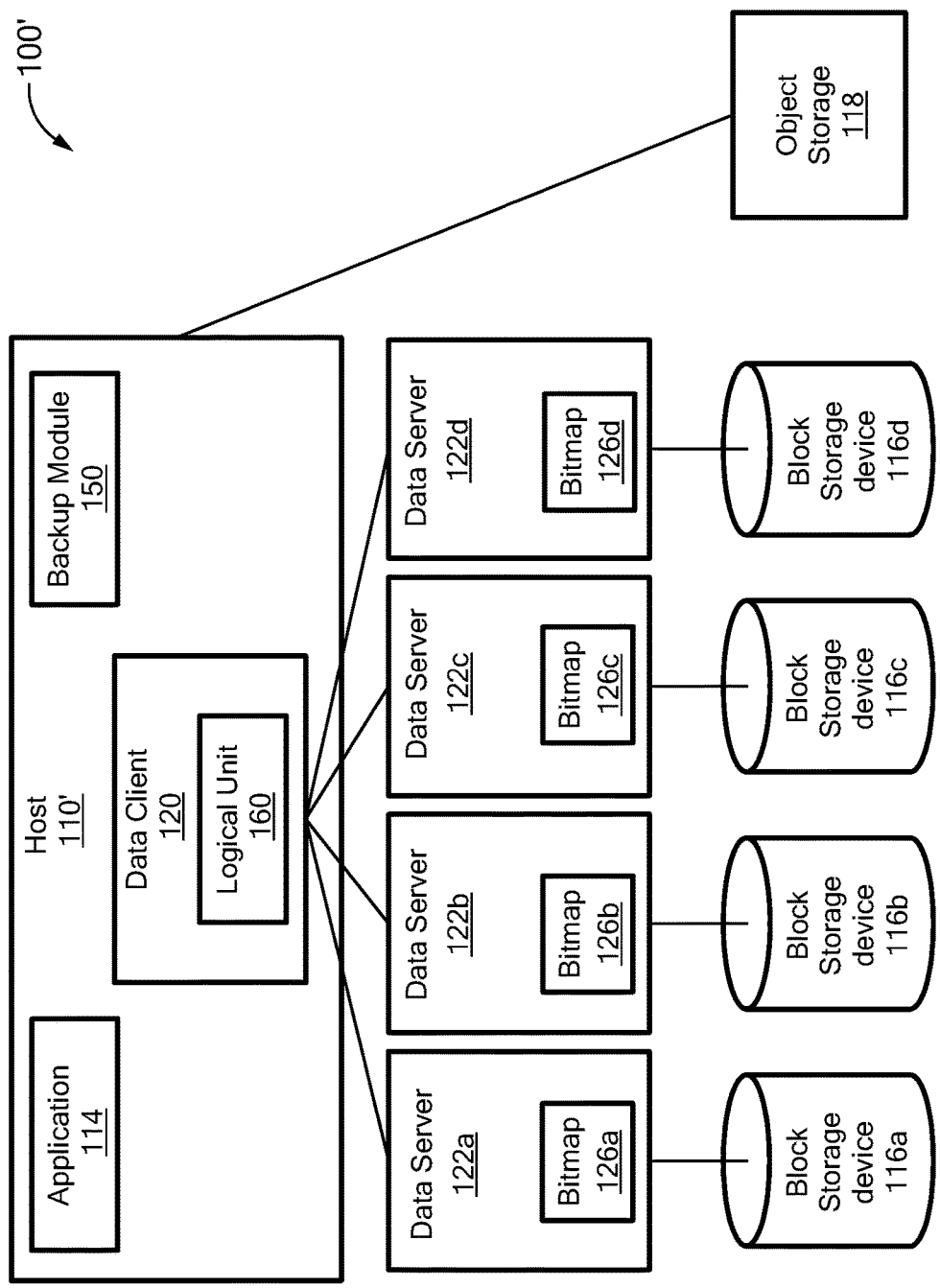
FIG. 2A is a block diagram of an example of the data protection system in FIG. 1.
Figure 2B:
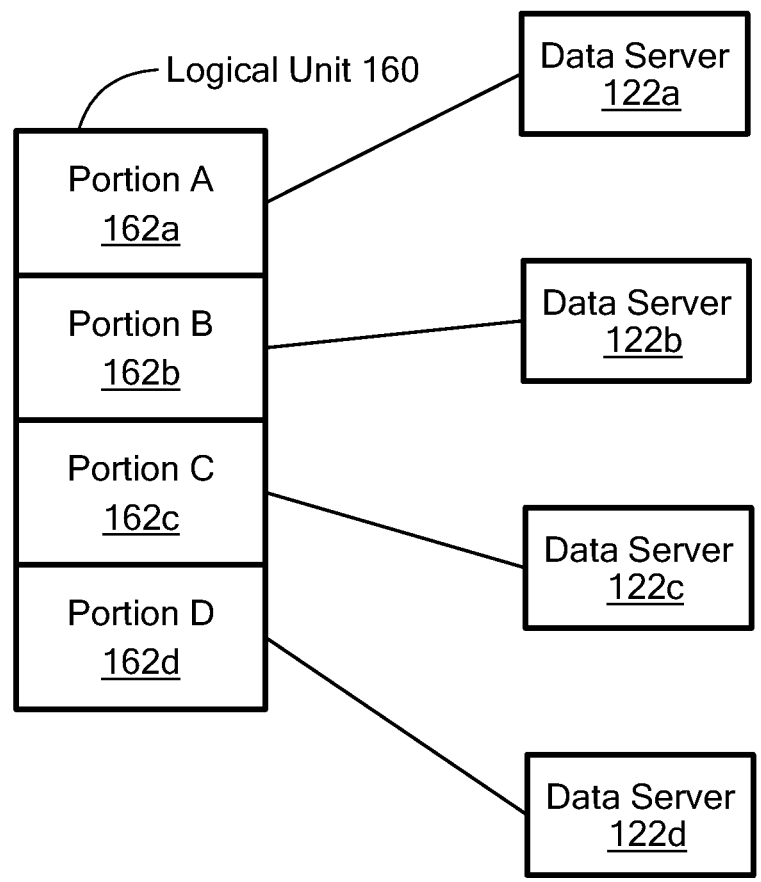
FIG. 2B is a block diagram of an example of a relationship between a logical unit and data servers.

Referring to FIGS. 2A and 2B, a data protection system 100' is an example of the data protection system 100 that includes a distributed storage environment. The data protection system 100' includes a host 110' and the object store 118. The system 100' also includes data servers 122a-122d each with a block storage device 116a-116d, respectively, and a data client 120 to provide data to the data servers 122a-122d for storage. Each data server 122a-122d is responsible for handling a portion of the logical unit 160. For example, a portion A 162a of the logical unit 160 is handled by the data server 122a, a portion B 162b of the logical unit 160 is handled by the data server 122b, a portion C 162c of the logical unit 160 is handled by the data server 122c and a portion D 162d of the logical unit 160 is handled by the data server 122d. A portion of the logical unit includes one or more data blocks. In one example, a data block may be 4 kb or 8 kb. In another example, a data block is any size designated by a user. Each server 122a-122d is responsible for writing data in their respective portion 162a-162d of the logical unit 160 to their respective block storage device 116a-116d. In some examples data blocks may be written to data servers 122a-122d (e.g., in the fashion of RAID algorithm used with non-distributed storage).

As will be further described herein, each data server 122a-122d includes a bit map for the portion of the logical unit it is handling. For example, the data servers 122a-122d include bit maps 126a-126d respectively. A bit-map is used to record whether a block changed or not. For example, if a block of data or blocks of data have changes changed a "1" is stored in the bit map for that block or blocks of data.

Figure 3:
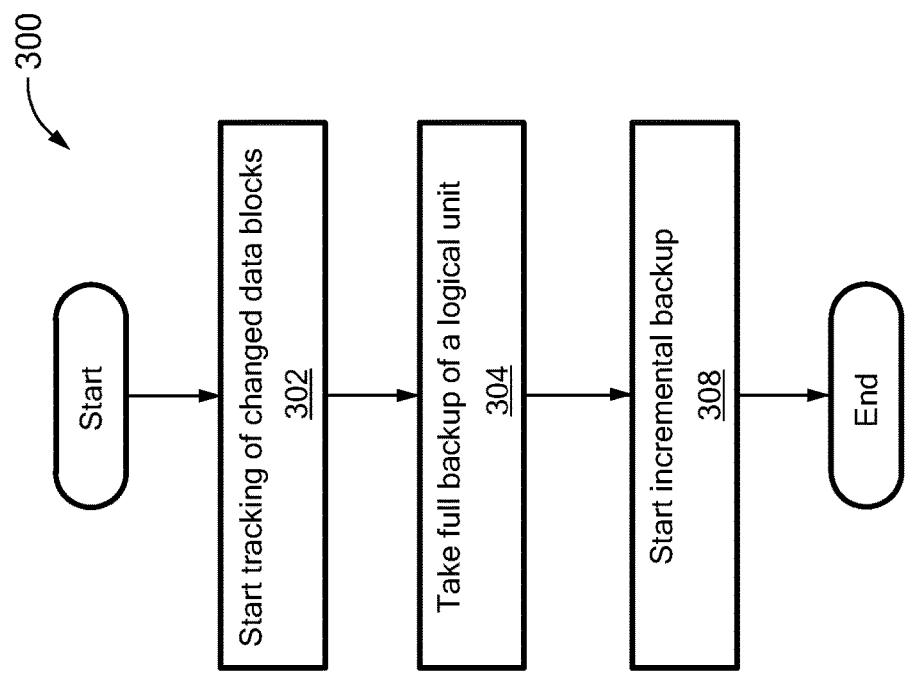
FIG. 3 is a flowchart of an example of a process to initiate incremental backups.

Referring to FIG. 3, a process 300 is an example of a process to initiate incremental backups. Process 200 starts tracking of changed data blocks (302). For example, a user initiates the tracking of changed data blocks. A command is issued to each data server handling a portion of the logical unit to start tracking dirty blocks. For example, the backup module 150 issues a command to each of the data servers 122a-122d to track dirty blocks. Typically, space would be allocated in memory for the bitmap. A dirty block is a block of data that is no longer the same (or changed) from a previous version because of a write request, for example. Bitmap processing tracks any block that has changed since the time that the dirty block tracking started or a new bitmap is started during dirty block tracking.

In the case where there is no prior full or incremental backup, process 300 begins by taking a full back-up of the logical unit 160 (304). In other cases, process 300 starts incremental backup (308).

Figure 4:
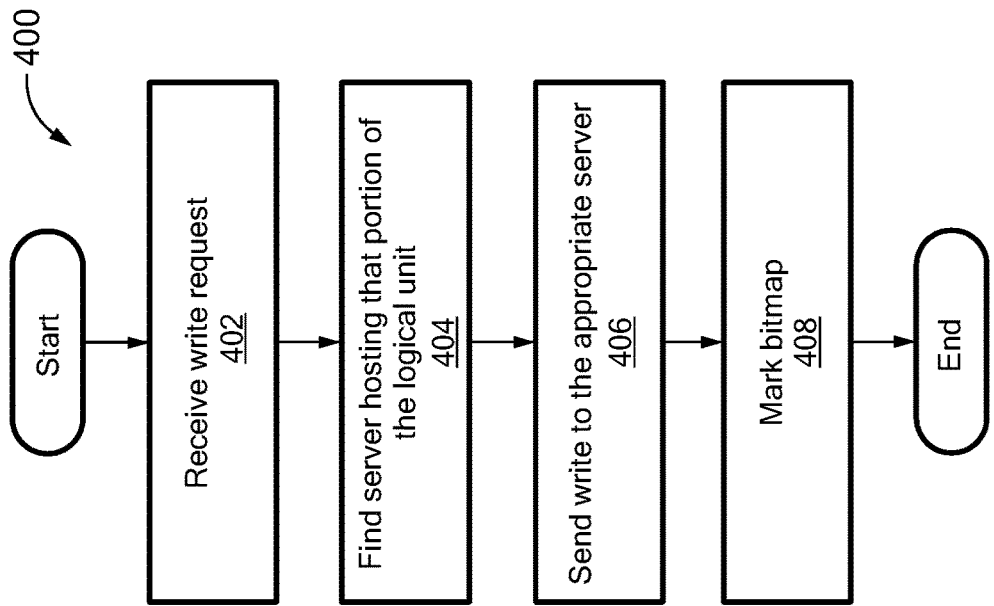
FIG. 4 is a flowchart of an example of a process to handle a write request.

Referring to FIG. 4, a process 400 is an example of a process to handle a write request. Process 400 receives a write request (402). For example, the application 114 sends a write request to write to the logical unit 160.

Process 400 finds the server hosting that portion of the logical unit (404) and sends the write request to the appropriate server (406). For example, the write request is for writing data to the portion C 162c of the logical unit 160 and the write request is sent to the data server 122c.

Process 400 marks the bit map. For example, the data server 122c marks the block as modified in the bit map 126c if the data server 126c has been designated to track dirty blocks from the process 300. The data server 122c writes to the block storage device 116c.

Figure 5:
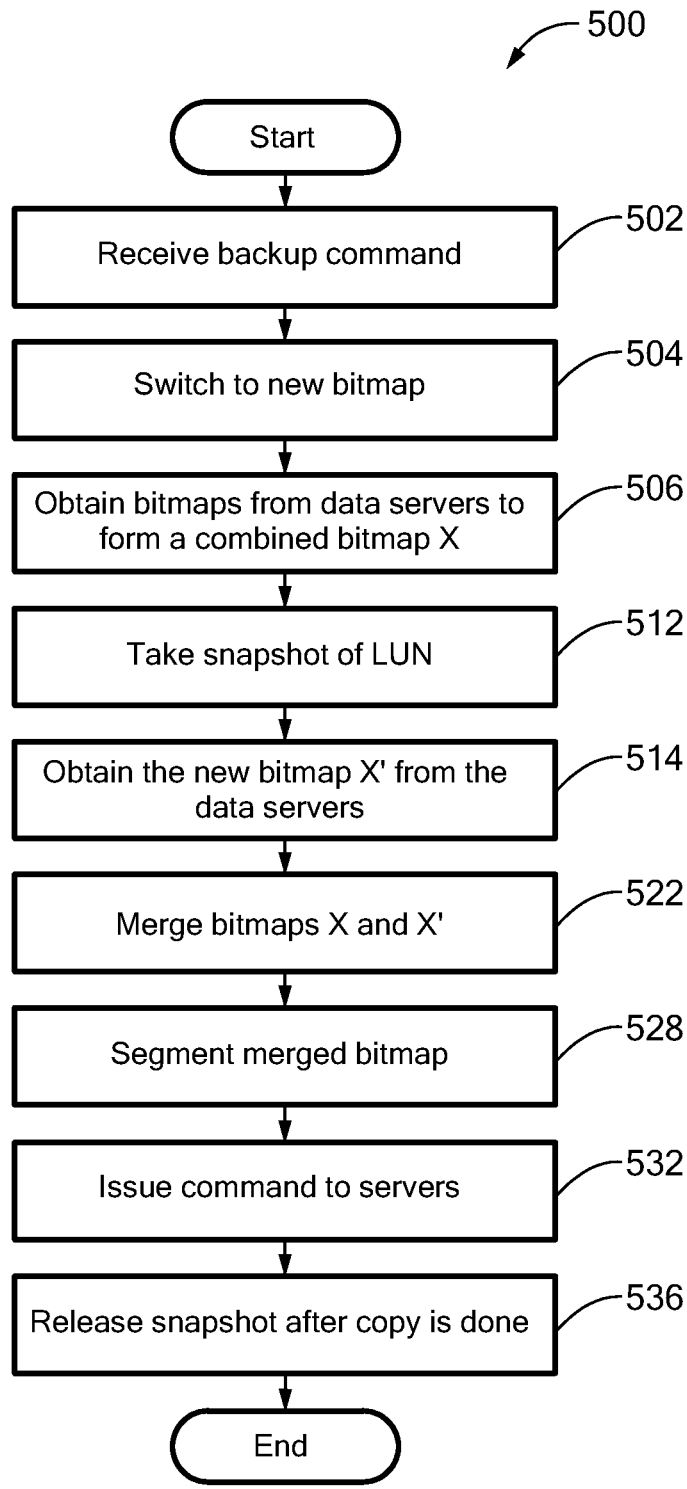
FIG. 5 is a flowchart of an example of a process to perform a backup.

Referring to FIG. 5, a process 500 is an example of a process to perform an incremental backup. Process 500 receives a backup command (502). For example, a command is received to backup the logical unit 160.

Process 500 switches to a new bitmap (506). For example, a command is issued to the data servers 122a-122d to start a new bit map. Switching bitmaps occurs between application writes. The action of switching to a new bitmap (504) interacts with process of writing data (400) in a way that guarantees that each write will update at least either the bitmap being switched from or the bitmap being switched to.

Process 500 obtains bit maps from data servers to form a combined bit map X (504). For example, if the logical unit 160 is being backed up, then the bit maps 126a-126d are retrieved from the data servers 122a-122d, respectively. In one example, processing blocks 504 and 506 are performed simultaneously.

Process 500 takes a snapshot of the logical unit (512). For example, the backup module takes or causes to be taken a snapshot of the logical unit 160 on the distributed block storage 116a-116d.

Process 500 obtains the new bitmaps from processing block 504 to form a new combined bitmap (514) and merges the previous combined bit map with the new combined bit map (522). For example, the combined bitmap X and a new combined bitmap X' are merged together to form a single bitmap using a logical "or" function.

Process 500 segments the merged bit map (528). For example, the merged bit map is segmented based on how the logical unit 160 is split across the data servers 122a-122d.

Process 500 issues a command to the data servers (532). For example, each data server 122a-122d receives its respective segmented portion of the merged bitmap and copies its respective changed portions from the snapshot taken in processing block 512 to the object store 118. In another embodiment, the backup module 150 may directly read the changed blocks from the snapshot and copy the changed blocks to the object store, though this loses the benefits of a parallel copy by the data servers and also incurs additional network overhead during the block reads.

Process 500 releases the snapshot after the copy is done (536). The backup module 150 releases the snapshot taken in processing block 512 to be, for example, erased after processing block 532 has completed.

Figure 6:
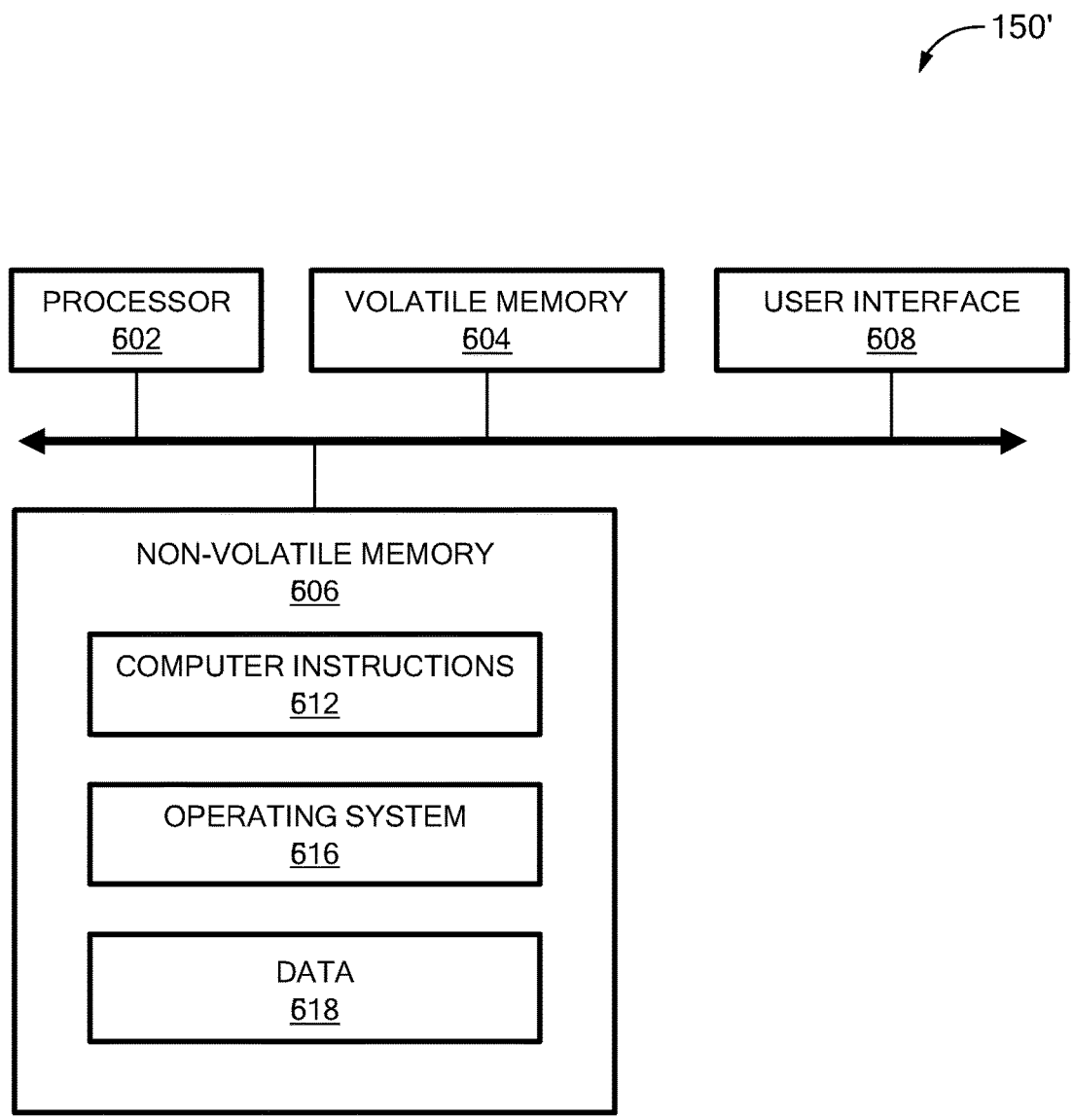
FIG. 6 is a computer on which any of the portions of the processes of FIGS. 3 to 5 may be implemented.

Referring to FIG. 6, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 300, 400, and 500).

The processes described herein (e.g., processes 300, 400, and 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300, 400, and 500 are not limited to the specific processing order of FIGS. 3 to 5, respectively. Rather, any of the processing blocks of FIGS. 3 to 5 may be re-ordered, combined or removed, performed in parallel or in serial, as necessary, to achieve the results set forth above.

The processing blocks (for example, in the processes 300, 400, and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   storing data in a logical unit of a distributed storage system, the distributed storage system comprising a plurality of data servers, each of the data servers being configured to manage a different respective portion of the logical unit;
   obtaining a plurality of first bitmaps from the data servers, each of the first bitmaps being obtained from a different one of the data servers;
   combining the first bitmaps to generate a first combined bitmap, the first combined bitmap including a plurality of first bits, each of the first bits being associated with one or more data blocks in the logical unit, each of the first bits indicating whether the first bit's associated data blocks have changed;
   taking a snapshot of the logical unit after the first combined bitmap is generated;
   obtaining a plurality of second bitmaps from the data servers, each of the second bitmaps being obtained from a different one of the data servers;
   combining the second bitmaps to generate a second combined bitmap, the second combined bitmap including a plurality of second bits, each of the second bits being associated with one or more data blocks in the logical unit, each of the second bits indicating whether the second bit's associated data blocks have changed after the snapshot of the logical unit is generated;
   merging the first and second combined bitmaps to form a merged bitmap;
   providing each of the data servers with a different segment of the merged bitmap, wherein each of the data servers is arranged to identify, based on the segment that is provided to the data server, changed portions in the snapshot and copy the changed portions into an object storage; and
   releasing the snapshot after the data servers have copied all changed portions of the snapshot to the object storage.

2. The method of claim 1, further comprising:
   receiving a write request to write data to a portion of the logical unit;
   determining which data server of the data servers handles the portion of the logical unit;
   sending the write request to the data server handling the portion of the logical unit; and
   marking a bitmap for each block of the logical unit changed by the write request.

3. The method of claim 1, further comprising issuing a command to each of the data servers to start tracking dirty blocks.

4. The method of claim 1, wherein the data servers are concurrently notified to record changes on a new bitmap and the bitmaps are obtained concurrently from the data servers.

5. An apparatus, comprising:
   electronic hardware circuitry configured to:
   store data in a logical unit of a distributed storage system, the distributed storage system comprising a plurality of data servers, each of the data servers being configured to manage a different respective portion of the logical unit;
   obtain a plurality of first bitmaps from the data servers, each of the first bitmaps being obtained from a different one of the data servers;
   combine the first bitmaps to generate a first combined bitmap, the first combined bitmap including a plurality of first bits, each of the first bits being associated with one or more data blocks in the logical unit, each of the first bits indicating whether the first bit's associated data blocks have changed; take a snapshot of the logical unit after the first combined bitmap is generated;
   obtain a plurality of second bitmaps from the data servers, each of the second bitmaps being obtained from a different one of the data servers;
   combine the second bitmaps to generate a second combined bitmap, the second combined bitmap including a plurality of second bits, each of the second bits being associated with one or more data blocks in the logical unit, each of the second bits indicating whether the second bit's associated data blocks have changed after the snapshot of the logical unit is generated;
   merge the first and second combined bitmaps to form a merged bitmap;
   provide each of the data servers with a different segment of the merged bitmap, wherein each of the data servers is arranged to identify, based on the segment that is provided to the data server, changed portions in the snapshot and copy the changed portions into an object storage; and
   release the snapshot after the data servers have copied all changed portions of the snapshot to the object storage.

6. The apparatus of claim 5, wherein the circuitry comprises at least one of a processor, a memory, a programmable logic device or a logic gate.

7. The apparatus of claim 5, further comprising circuitry configured to:
   receive a write request to write data to a portion of the logical unit;
   determine which data server of the data servers handles the portion of the logical unit;
   send the write request to the data server handling the portion of the logical unit; and
   mark a bitmap for each block of the logical unit changed by the write request.

8. The apparatus of claim 5, further comprising circuitry configured to issue a command to each of the data servers to start tracking dirty blocks.

9. An article comprising:
   a non-transitory computer-readable medium that stores computer-executable instructions to perform incremental backup of a logical unit in a distributed storage system, the instructions causing a machine to:
   store data in a logical the distributed storage system, the distributed storage system comprising a plurality of data servers, each of the data servers being configured to manage a different respective portion of the logical unit;
   obtain a plurality of first bitmaps from the data servers, each of the first bitmaps being obtained from a different one of the data servers;
   combine the first bitmaps to generate a first combined bitmap, the first combined bitmap including a plurality of first bits, each of the first bits being associated with one or more data blocks in the logical unit, each of the first bits indicating whether the first bit's associated data blocks have changed;

take a snapshot of the logical unit after the first combined bitmap is generated;

obtain a plurality of second bitmaps from the data servers, each of the second bitmaps being obtained from a different one of the data servers;

combine the second bitmaps to generate a second combined bitmap, the second combined bitmap including a plurality of second bits, each of the second bits being associated with one or more data blocks in the logical unit, each of the second bits indicating whether the second bit's associated data blocks have changed after the snapshot of the logical unit is generated;

merge the first and second combined bitmaps to form a merged bitmap; and provide each of the data servers with a different segment of the merged bitmap, wherein each of the data servers is arranged to identify, based on the segment that is provided to the data server, changed portions in the snapshot and copy the changed portions into an object storage, and release the snapshot after the data servers have copied all changed portions of the snapshot to the object storage.

10. The article of claim 9, further comprising instructions causing the machine to:

receive a write request to write data to a portion of the logical unit;

determine which data server of the data servers handles the portion of the logical unit;

send the write request to the data server handling the portion of the logical unit; and mark a bitmap for each block of the logical unit changed by the write request.

11. The article of claim 9, further comprising instructions causing the machine to issue a command to each of the data servers to start tracking dirty blocks.

\* \* \* \* \*